(12) United States Patent
Qi et al.

(10) Patent No.: US 8,138,300 B1
(45) Date of Patent: Mar. 20, 2012

(54) INTERMEDIATE TRANSFER MEMBER

(75) Inventors: Yu Qi, Oakville (CA); Nan-Xing Hu, Oakville (CA); Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/886,674

(22) Filed: Sep. 21, 2010

(51) Int. Cl.
*C08G 63/02* (2006.01)
*C08G 63/00* (2006.01)

(52) U.S. Cl. ............ 528/190; 430/73; 430/78; 430/96; 528/196; 528/198

(58) Field of Classification Search ............ 430/73, 430/78, 96; 528/190, 196, 198
See application file for complete search history.

(56) References Cited

U.S. PATENT DOCUMENTS 7,189,778 B2 * 3/2007 Tobita et al. ............ 524/495

* cited by examiner

*Primary Examiner* — Terressa Boykin
(74) *Attorney, Agent, or Firm* — Hoffman Warnick LLC

(57) ABSTRACT

There is disclosed an intermediate transfer member that includes a layer of a poly(imide-carbonate) copolymer having dispersed therein conductive particles. The layer can be a surface layer.

17 Claims, 2 Drawing Sheets

INTERMEDIATE TRANSFER MEMBER

BACKGROUND

1. Field of Use

This disclosure is directed to an image-forming apparatus and an intermediate transfer member.

2. Background

Image-forming apparatuses in which a color or black and white image is formed by using an intermediate transfer member to electrostatically transfer toner are well known. When an image is formed on a sheet of paper in a color image-forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor, superimposed on an intermediate transfer member, and then transferred to a sheet of paper.

An intermediate transfer member is required in an image-forming apparatus. For low end electrophotographic machines, thermoplastic intermediate transfer members are used due to their low cost; however, the modulus of thermoplastic materials is relatively low from about 1,000 to 2,000 MPa. Materials such as polycarbonate, polyester and polyamide are used for such machines.

For high end electrophotographic machines, thermoplastic or thermoset polyimides or polyamideimides are widely used due to their high modulus (over 3,500 MPa); however, intermediate transfer members using these materials are more expensive to make. Both the raw material cost and manufacturing process cost are higher using thermoplastic or thermoset polyimides or polyamideimides. One issue is that the materials used in higher cost machines do not easily release from metal substrates. An intermediate transfer belt possessing high modulus and excellent release for high end machines is desired.

SUMMARY

According to various embodiments there is disclosed an intermediate transfer member comprising a layer of a poly(imide-carbonate) copolymer having dispersed therein, and in embodiments, conductive particles.

According to various embodiments there is provided an intermediate transfer member that includes a substrate layer and a surface layer. The surface layer comprises a poly(imide-carbonate) copolymer and, in embodiments, conductive particles.

According to various embodiments, disclosed herein is an intermediate transfer member that includes a surface layer comprising a poly(imide-carbonate) copolymer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
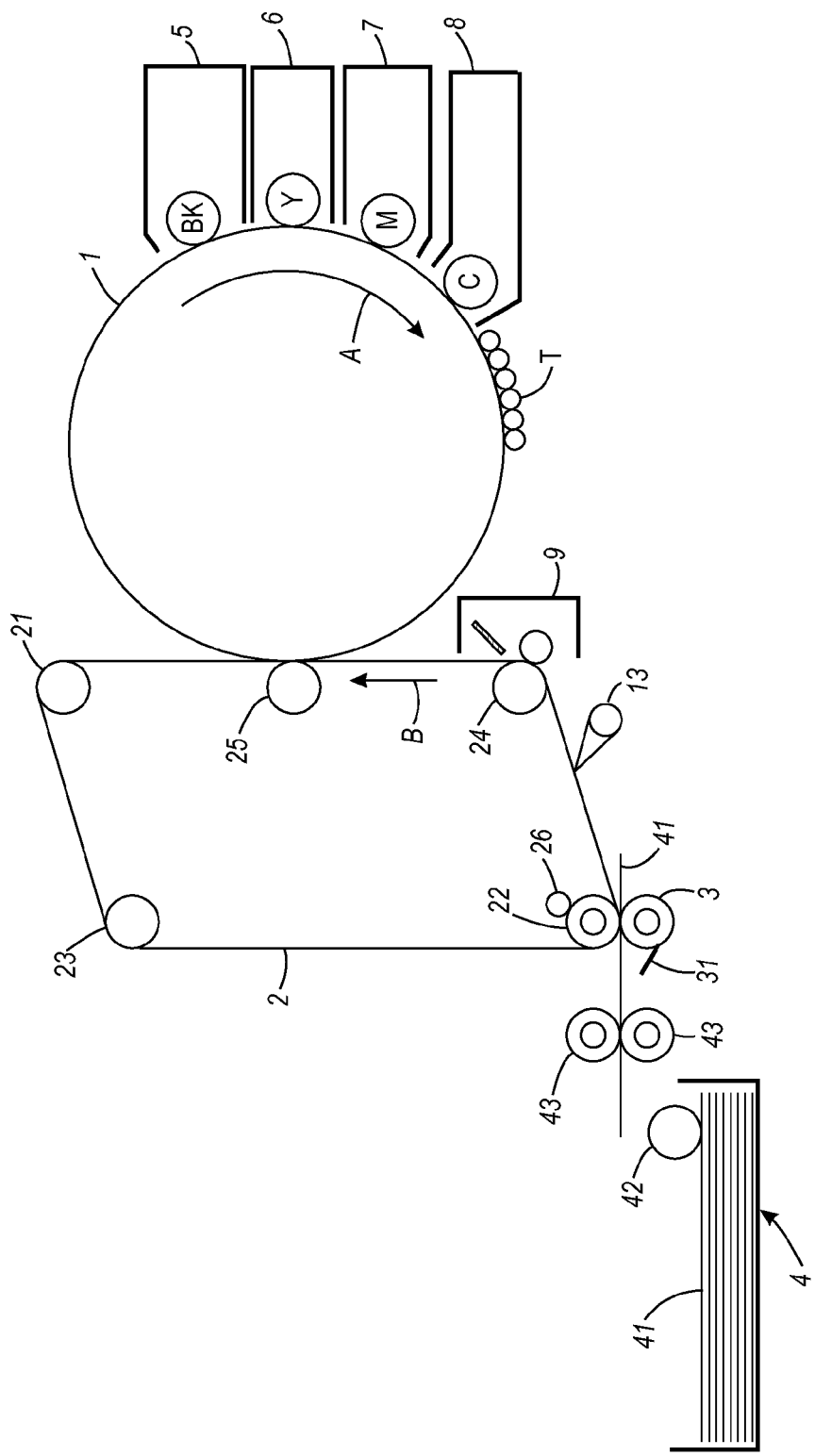
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as a contact type charger using a conductive or semiconductive roller, brush, film and rubber blade, scorotron charger or corotron charge making use of corona discharge, and others. Above all, the contact type charging unit is preferred from the viewpoint of excellent, charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using a member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be same as the first transfer unit such as a contact type transfer charger using a transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as a heat roller fixing unit and an oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as an image carrier, a transfer member 2 as an intermediate transfer member such as a transfer belt, a bias roller 3 as a transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred, is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of a multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the paper can be by any suitable technique conventionally used in electrophotography, such as corona transfer, pressure transfer, bias transfer, and combinations of those transfer means, and the like.

Figure 2:
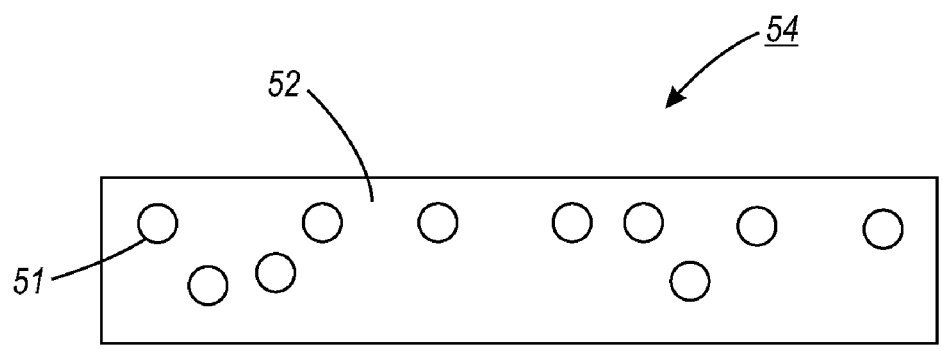
FIG. 2 is a schematic representation of an embodiment disclosed herein.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.
One Layer Configuration In an embodiment shown in FIG. 2, the intermediate transfer member 54 is in the form of a film in a one layer configuration. The intermediate transfer member 54 includes a poly(imide-carbonate) copolymer 52, and in embodiments, having dispersed therein conductive particles 51. The conductive particles 51 are optional and used to control the conductivity.

The intermediate transfer member possesses a modulus of from about 2000 MPa to about 4000 MPa, or from about from about 2500 MPa to about 3500 MPa, from about 3000 MPa to about 3400 MPa, or from about 3200 to about 3400 MPa.
Two Layer Configuration In an embodiment, the intermediate transfer member 54 can be disposed on a substrate in a two layer configuration. In such a configuration the intermediate transfer member 54 is the surface layer. In such an embodiment the surface layer has a thickness of from about 1 micron to about 150 microns, or from about 10 microns to about 100 microns. The substrate layer can be selected from a number of materials including polyesters, polyurethanes, polyimides, polyamideimides, polyetherimides, fluorinated polyimides, polyolefins (such as polyethylene and polypropylene, polyethylene-co-polytetrafluoroethylene), polyamides (including polyamideimides), polyetherimides, polyphenylene sulfides, polysulfones, polyethersulfones, polyphenylsulfones, phenoxy resins, polycarbonates, PVDF or acrylics, or blends or alloys of such materials.

The poly(imide-carbonate) copolymer intermediate transfer member possesses functional resistivity, readiness to release from the coating substrate and high modulus. The poly(imide-carbonate) copolymer combines the good attributes of a polycarbonate polymer (excellent release) and the polyimide polymer (excellent modulus).

In comparing an intermediate transfer member made of a poly(imide-carbonate) copolymer with an intermediate transfer member made of a polycarbonate polymer, the poly(imide-carbonate) copolymer intermediate transfer member possesses higher modulus (3,200 MPa versus 1,600 MPa) while maintaining excellent release property from a coating substrate. When compared with the polyimide intermediate transfer member, the disclosed polyimide polycarbonate copolymer intermediate transfer member possesses a little lower modulus (3,200 MPa versus 3,500 MPa); however, there is improved release. Conventional polyimide intermediate transfer members are very difficult to release from the coating substrate such as metals.

The poly(imide-carbonate) copolymer can be represented by:

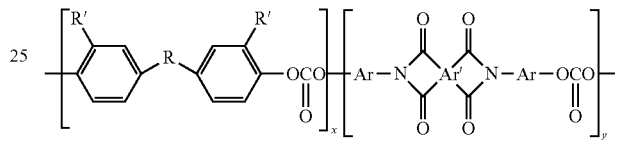

wherein R' is hydrogen or methyl; R is methylene, isopropylidene, cyclohexylidene, sulfonyl, ethylidene, or hexafluoroisopropylidene; Ar is p-phenylene or m-phenylene; and Ar' is benzene, diphenylbenzene, biphenyl, naphthalene, benzophenone, or perylene; x and y each represents the mole percent of the repeating units, x is from about 70 to about 98, or from about 75 to about 95, or from about 80 to about 90, and y is from about 2 to 30, or from about 5 to about 25, or from about 10 to about 20, and the sum of x+y is equal to about 100.

In embodiments, the poly(imide-carbonate) copolymer can be represented by the formula:

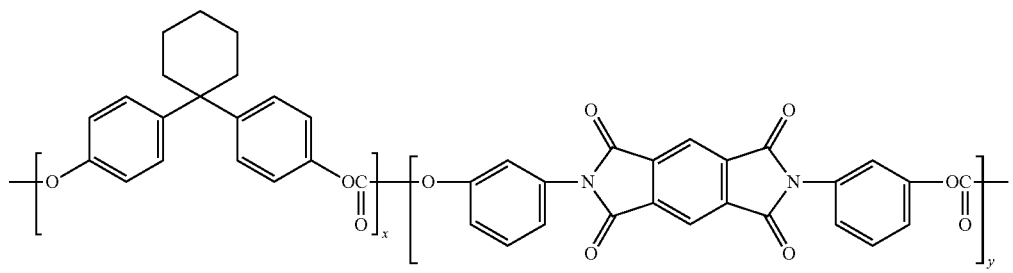

wherein x and y each represents the mole percent of the repeating segment, and x is from about 70 to about 98, or from about 75 to about 95, or from about 80 to about 90 and y is from about 2 to 30, or from about 5 to about 25, or from about 10 to about 20, and the sum of x+y is equal to about 100.

The poly(imide-carbonate) copolymer suitable for used in embodiments herein can be represented by the following formulas;

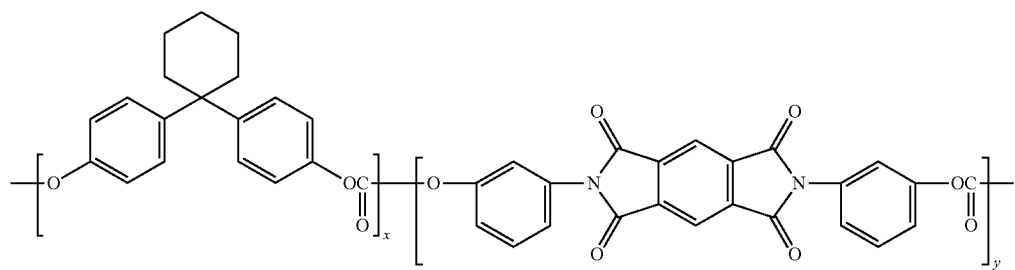
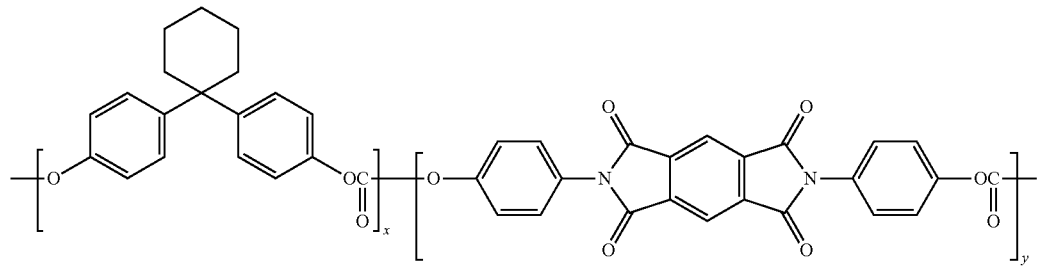
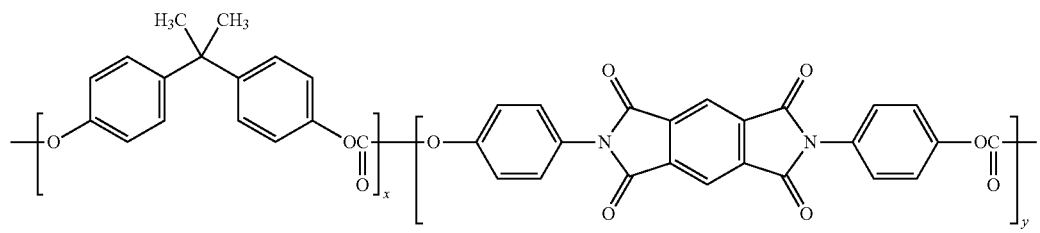
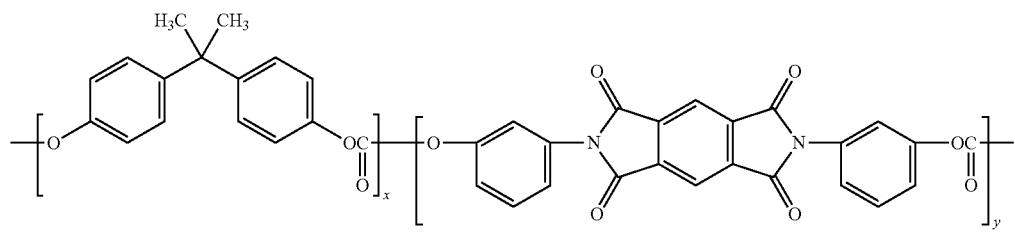
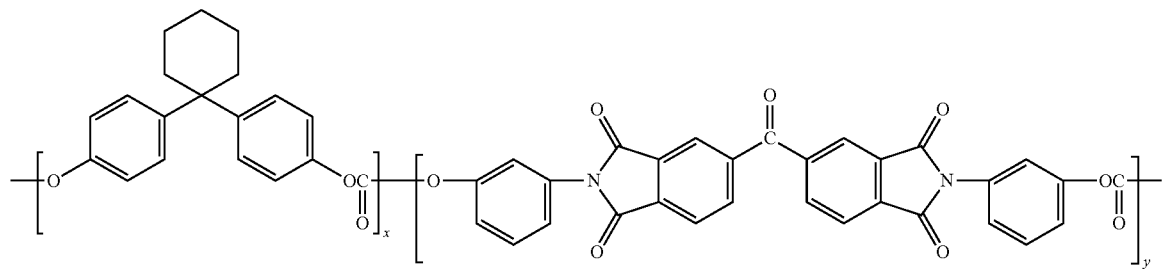
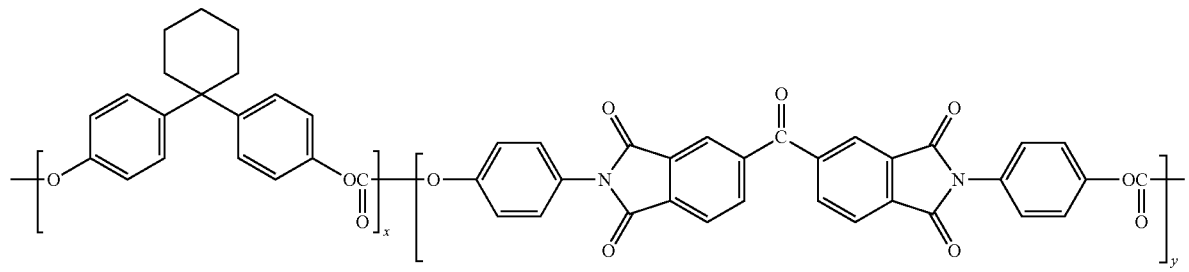

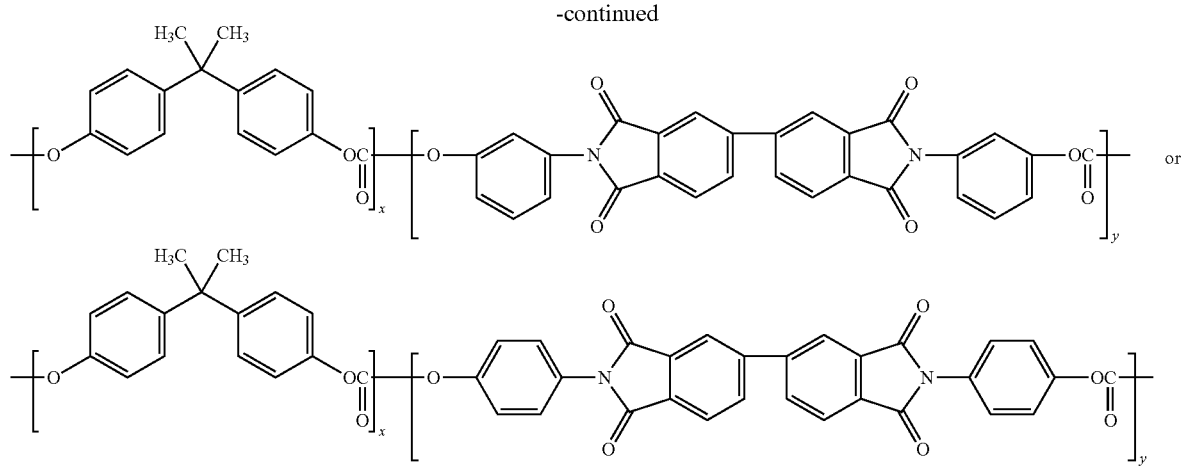

wherein x and y each represents the mole percent of the repeating segment, and x is from about 75 to about 95 or from about 75 to about 95, or from about 80 to about 90 and y is from about 2 to 30, or from about 5 to about 25, or from about 10 to about 20, and optionally each with a weight average molecular weight (Mw) of from about 30,000 to about 500,000, or from about 100,000 to about 300,000, as measured by DSC, and a number average molecular weight (Mn) of from about 5,000 to about 100,000, or from about 20,000 to about 70,000 as measured by GPC, and the sum of x+y is equal to about 100.

The poly(imide-carbonate) polymer of the present disclosure can be prepared by modified known interfacial phosgenation processes, reference U.S. Pat. No. 4,393,190, the disclosure of which is totally incorporated herein by reference. Specifically, the poly(imide carbonate) polymer can be prepared by the following method. A mixture of a biphenol monomer, such as 4,4-cyclohexylidenebisphenol together with an aqueous inorganic base solution, such as sodium hydroxide, and an organic solvent, such as dichloromethane, in the presence of a suitable amount, such as about 0.5 to about 3 weight percent, of a phase transfer catalyst like benzyltriethylammonium chloride are stirred at room temperature (about 25° C.). To the mixture can then be added a triphosgene dichloromethane solution and a bis(imidephenol) monomer. A second catalyst, such as triethylamine, tributyl amine or the like (about 0.1 weight percent), can be added to accelerate the reaction. About 10 percent excess of inorganic base solution may be selected to increase the molecular weight by about 20 percent at the end of a reaction. The interfacial phosgenation is generally accomplished at a temperature of from about 0° C. to about 100° C., and more specifically from room temperature (about 25° C.) to about 50° C. The reaction time is generally from, for example, about 10 minutes to about 5 hours depending on the molecular weight of the polymer desired. The polymeric product obtained can be purified by dissolving it in an organic solvent, such as dichloromethane or tetrahydrofuran (THF), and then precipitating in methanol to provide a pure, for example from 90 to 99.5 percent pure, polymer which is suitable as charge transport layer binders, and which polymer and its structure can be confirmed by known methods, such as NMR.

Illustrative examples of bisphenol monomers selected for the preparation of the poly(imide-carbonate)s include, for example, bisphenol, bis(hydroxyphenyl)methane, bis(hydroxyphenyl)dimethylmethane, bis(hydroxyphenyl)cyclohexane, and the like; present in an amount of, for example, from about 70 to about 98 weight percent, or from about 80 to about 95 weight percent.

Illustrative examples of bis(imidephenol) monomers selected for the preparation of the poly(imide-carbonate) can be represented by

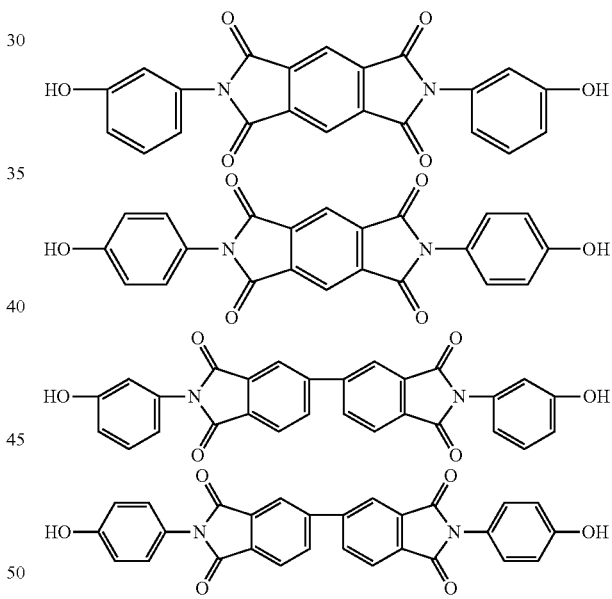

and the like, present in an amount of for example, from about 2 to about 30 weight percent, or from about 5 to about 20 weight percent.

Certain electrically conductive particles 51 are dispersed in the poly(imide-carbonate) copolymer 52, and help to decrease the resistivity into the desired surface resistivity range of from about $10^8$ ohms/square, to about $10^{13}$ ohms/square, or from about $10^{10}$ ohms/square, to about $10^{12}$ ohms/square. The volume resistivity is from about $10^8$ ohm-cm to about $10^{12}$ ohm-cm, or from about $10^9$ ohm-cm to about $10^{11}$ ohm-cm. The resistivity can be provided by varying the concentration of the conductive particles 51.

Examples of conductive particles 51 include carbon blacks such as carbon black, graphite, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and polymers such as polyaniline and polythiophene, and mixtures thereof. The conductive filler may be present in an amount of from about 0.1 to about 50 and or from about 3 to about 40, or from about 5 to about 20 parts by weight of total solids of the intermediate transfer member.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is primarily dependent on surface area and its structure; generally, the higher the surface area and the higher the structure, the more conductive the carbon black. Surface area is measured by the B.E.T. nitrogen surface area per unit weight of carbon black, and is the measurement of the primary particle size. The surface area of the carbon black described herein is from about 460 $m^2/g$ to about 35 $m^2/g$. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); Channel carbon blacks available from Evonik-Degussa; Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

Further examples of conductive fillers include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC®ECP-S, M and T) and those antimony doped tin oxides without a core particle (e.g., ZELEC®ECP-3005-XC and ZELEC®ECP-3010-XC, ZELEC® is a trademark of DuPont Chemicals Jackson Laboratories, Deepwater, N.J.). The core particle may be mica, $TiO_2$ or acicular particles having a hollow or a solid core.

In another embodiment, the electrically conductive particles include antimony doped tin oxide coated on an inert core particle (e.g., ZELEC® ECP-S, M and T). ZELEC® is a trademark of DuPont Chemicals Jackson Laboratories, Deepwater, N.J. The core particle may be mica, $TiO_2$ or acicular particles having a hollow or a solid core.

In another embodiment, antimony doped tin oxide particles are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure.

Forms of antimony doped tin oxide are commercially available under the tradename ZELEC® ECP (electroconductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC ECP-T), and a plate shaped mica core product (ZELEC® ECP-M).

The thickness of the intermediate transfer member as a single layer is from about 30 microns to about 400 microns, or from about 50 microns to about 200 microns, or from about 70 microns to about 150 microns.

A method of manufacturing the intermediate transfer member includes mixing conductive particles, poly(imide-carbonate) and a solvent to form a dispersion. Examples of the solvent selected to form the dispersion include toluene, tetrahydrofuran, N,N'-dimethylformamide, N,N'-dimethylacetamide, N-methyl pyrrolidone, methylene chloride and the like and mixtures thereof. The dispersion of polymer and conductive particles is coated on a layer of a first polymer and cured. The dispersion is coated on a substrate or substrate layer in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The poly(imide-carbonate) polymer of the following structure (x=95 mole percent, y=5 mole percent) was synthesized as follows:

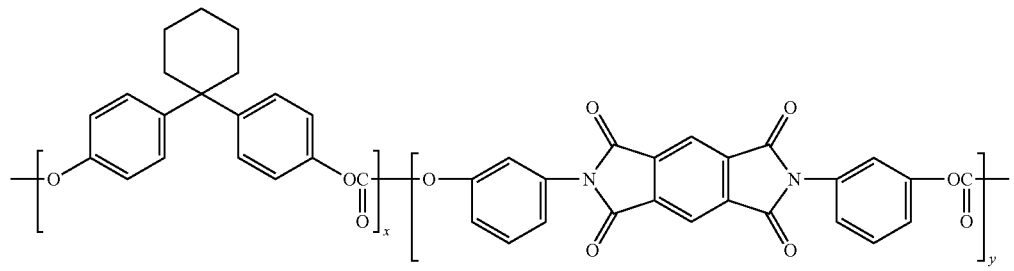

To a 5-liter round-bottomed flask was charged a mixture of 218.12 grams of 1,2,4,5-benzenetetracarboxylic dianhydride, 240.09 grams of 3-aminophenol and 2.5 liters of acetic acid, and the resulting mixture was stirred at about 110° C. for 6 hours. After the reaction mixture was cooled down to room temperature (about 25° C.), the resulting yellowish solid was collected by filtration and then stirred in 2.5 liters of methanol at room temperature (about 25° C.). After filtration, the solid material obtained was collected by filtration, and then recrystallized from dimethylformaldhyde to provide, after drying in a vacuum oven for 48 hours at about 150° C., 384 grams of bis(imidephenol) (95.9% isolated yield, (structure confirmed by NMR) of

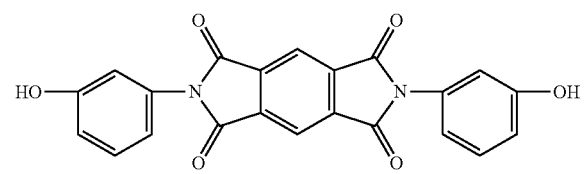

A mixture of 2.002 grams of bis(imidephenol) as obtained above, 0.228 grams of benzyltriethylammonium chloride, 200 grams of a 0.4% aqueous sodium hydroxide solution, 0.30 gram of tributylamine and 85 milliliters of dichloromethane were mechanically stirred in a 2-liter flask equipped with a mechanical stir. A mixture of 21.63 grams of 4,4-cyclohexylbisphenol bischloroformate in 85 milliliters of methylene chloride was added slowly to the mixture. The mixture was stirred using a magnetic stirring bar at room temperature, about 25° C., for 10 minutes, a slurry containing 10.73 grams of 4,4-cyclohexylbisphenol in 200 grams of 1.5% sodium hydroxide solution was added, and the pH of the reaction mixture (measured by a pH meter) was maintained at about 12 with additional sodium hydroxide solution as needed. After being stirred for 4 hours, the reaction mixture was diluted with 300 milliliters of methylene chloride and transferred to a 2-liter separatory funnel and allowed to sit to phase separate overnight, about 23 hours. The resulting organic layer was then separated and added dropwise into 3 liters of stirring methanol. The precipitated polymer was collected by filtration and dried in vacuum oven at 60° C. overnight, about 23 hours. The polymer product was then dissolved in 700 milliliters of methylene chloride, and again precipitated from 3 liters of methanol. The precipitated polymer product was washed with 2.5 liters of methanol, and dried in vacuum oven at about 60° C. overnight to provide 26 grams of the above poly(imide-carbonate) (86% isolated yield, the structure being confirmed by NMR) and with a weight average molecular weight ($M_w$) of the poly(imide-carbonate) of 158,000 as measured by GPC using polystyrene as standard.

The poly(imide-carbonate) (about 18 weight percent) was dissolved in a THF/monochlorobenzene=1/2 solvent mixture (about 80 weight percent), and then milled with varying amounts of carbon black (color black FW-1 from Degussa, about 2 weight percent). The coating dispersion was coated on a stainless steel substrate, and then subsequently dried at about 120° C. for 10 minutes (Example 1). The coating was readily released from the substrate, and a 100 micron thick intermediate transfer belt (ITB) device was obtained. The ITB was flat with no curl. Both surface resistivity and Young's modulus were measured using the standard methods, and the results are shown in Table 1.

As a comparison, the data from common polycarbonate ITB and polyimide ITB were also included in Table 1.

TABLE 1

| | Surface resistivity (ohm/sq) | Young's modulus (MPa) | Release from metal substrate |
|---|---|---|---|
| Example 1 | $2.3 \times 10^{10}$ | 3,200 | excellent |
| polycarbonate ITB | $3.7 \times 10^{10}$ | 1,600 | excellent |
| polyimide ITB | $7.8 \times 10^{10}$ | 3,500 | difficult |

In conclusion, an ITB comprising a poly(imide-carbonate) copolymer possesses functional resistivity, readiness to release from the coating substrate and high modulus.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. An intermediate transfer member comprising:
a layer comprising a poly(imide-carbonate) copolymer having the structure:

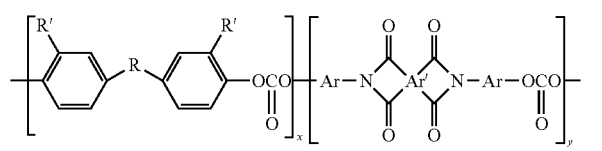

wherein R' is hydrogen or methyl; R is methylene, isopropylidene, cyclohexylidene, sulfonyl, ethylidene, or hexafluoroisopropylidene; Ar is p-phenylene or m-phenylene; and Ar' is benzene, diphenylbenzene, biphenyl, naphthalene, benzophenone, or perylene; x and y each represents the mole percent of the repeating units, x is from about 70 to about 98, and y is from about 2 to 30 and a sum of x+y is equal to about 100, having dispersed therein conductive particles.

2. The intermediate transfer member of claim 1 wherein the poly(imide-carbonate) copolymer is selected from the group consisting of

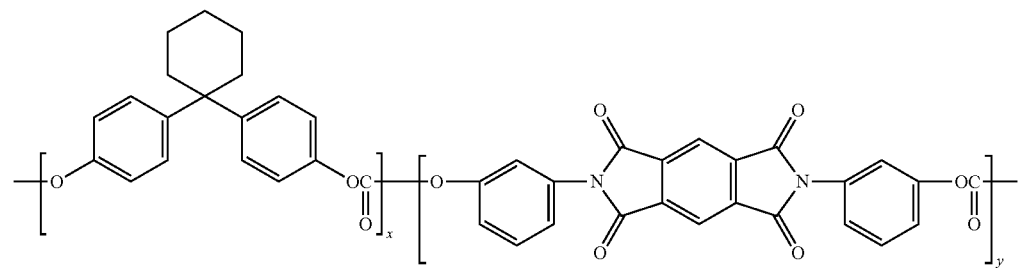

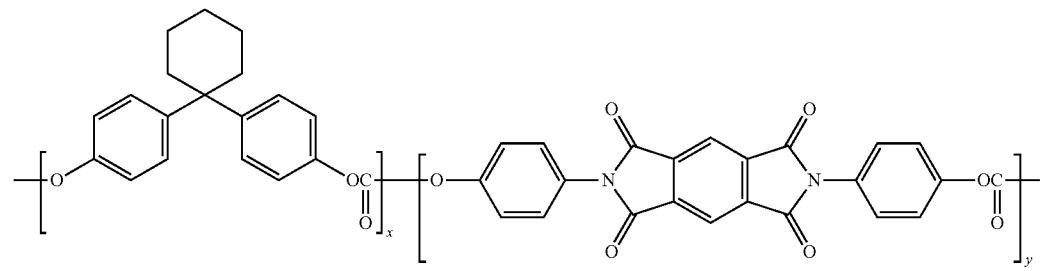

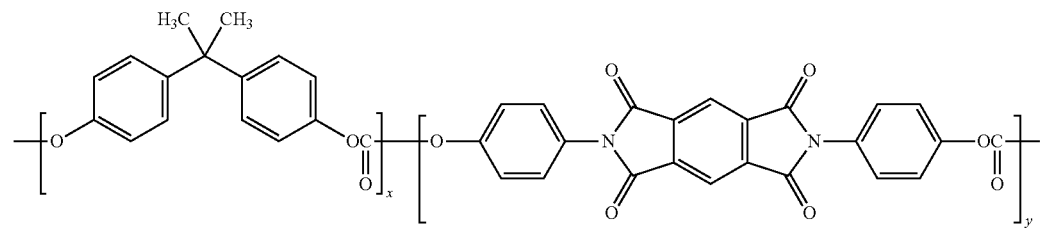

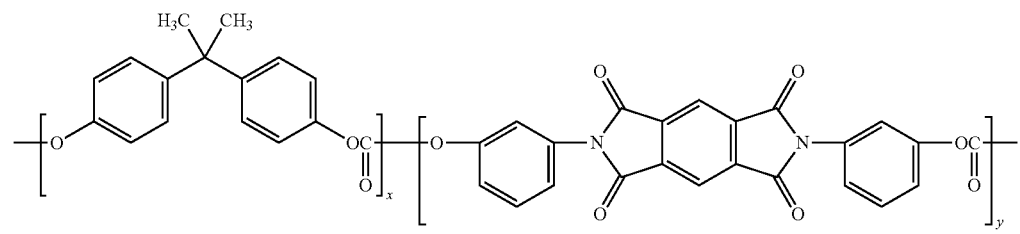

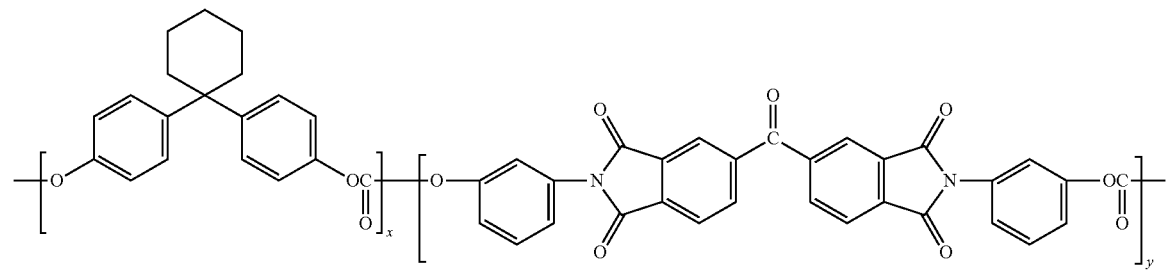

-continued

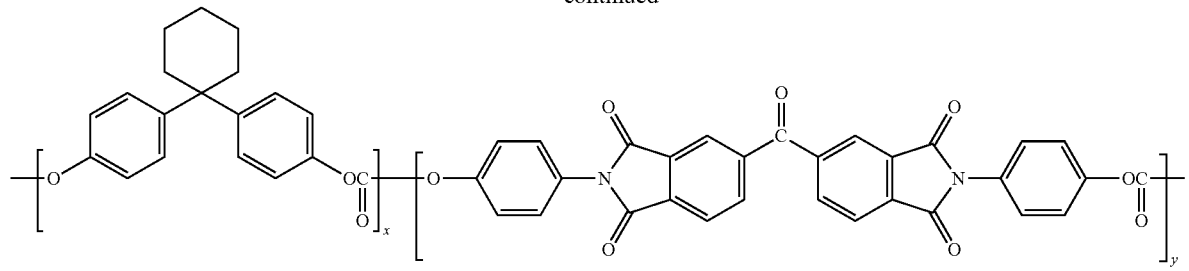

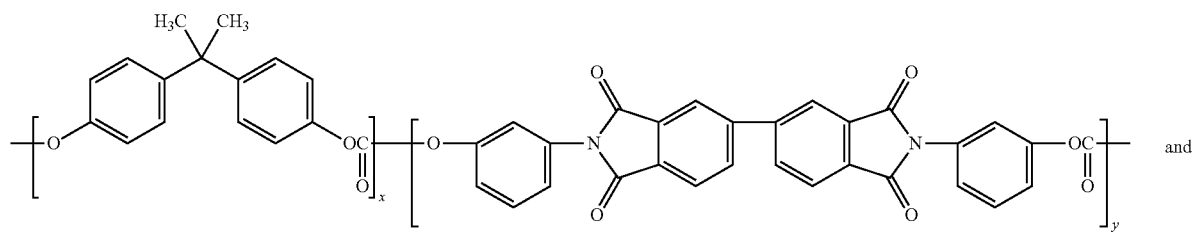
and

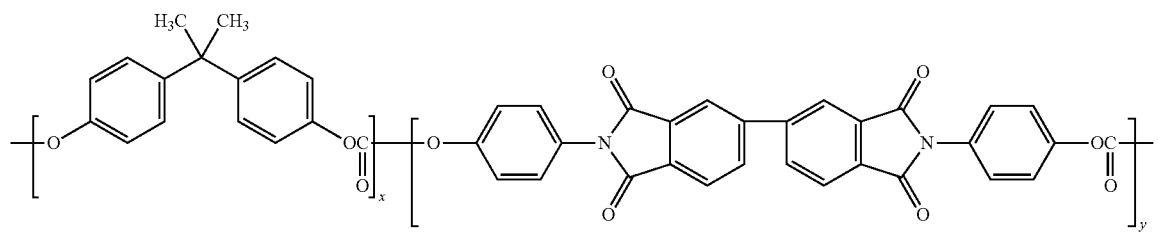

wherein x and y each represents the mole percent of the repeating segment, and x is from about 75 to about 95, y is from about 5 to about 25, a sum of x+y is equal to about 100, and optionally each with a weight average molecular weight (Mw) of from about 30,000 to about 500,000, and a number average molecular weight (Mn) of from about 5,000 to about 100,000.

3. The intermediate transfer member of claim 1 wherein the poly(imide-carbonate) copolymer is represented by the following formula:

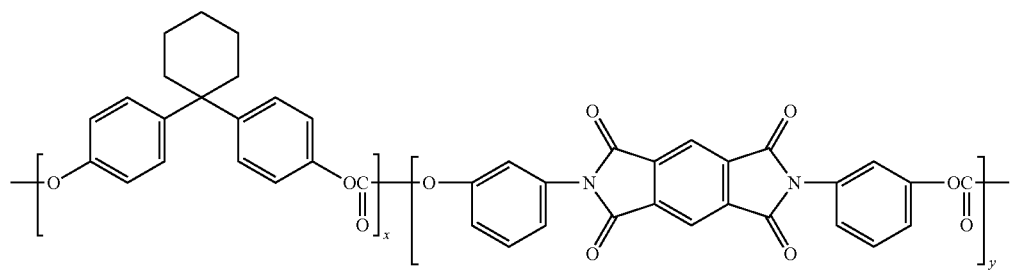

wherein x and y each represents the mole percent of the repeating segment, x is from about 75 to about 95, y is from about 5 to about 25 and a sum of x+y is equal to about 100.

4. The intermediate transfer member of claim 1 wherein the conductive particles are selected from the group consisting of carbon black, graphite, acetylene black, fluorinated carbon black, metal oxides, doped metal oxides polyaniline, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene and mixtures thereof.

5. The intermediate transfer member of claim 1, wherein the layer comprises conductive particles in an amount of from about 0.1 weight percent to about 50 weight percent of total solids of the transfer member.

6. The intermediate transfer member of claim 1, wherein the layer has a surface resistivity of from about $10^8$ Ω/square to about $10^{13}$ Ω/square.

7. The intermediate transfer member of claim 1, wherein the layer has a thickness of from about 30 microns to about 400 microns.

8. An intermediate transfer member comprising:
a substrate layer; and
a surface layer comprising a poly(imide-carbonate) copolymer having the structure:

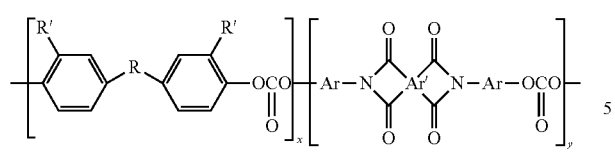

wherein R' is hydrogen or methyl; R is methylene, isopropylidene, cyclohexylidene, sulfonyl, ethylidene, or hexafluoroisopropylidene; Ar is p-phenylene or m-phenylene; and Ar' is benzene, diphenylbenzene, biphenyl, naphthalene, benzophenone, or perylene; x and y each represents the mole percent of the repeating units, x is from about 70 to about 98, y is from about 2 to 30 and a sum of x+y is equal to about 100, and conductive particles.

9. The intermediate transfer member of claim 8 wherein the poly(imide-carbonate) copolymer is selected from the group consisting of:

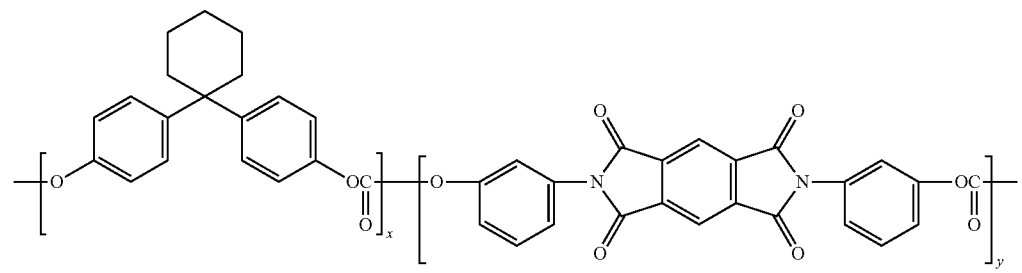

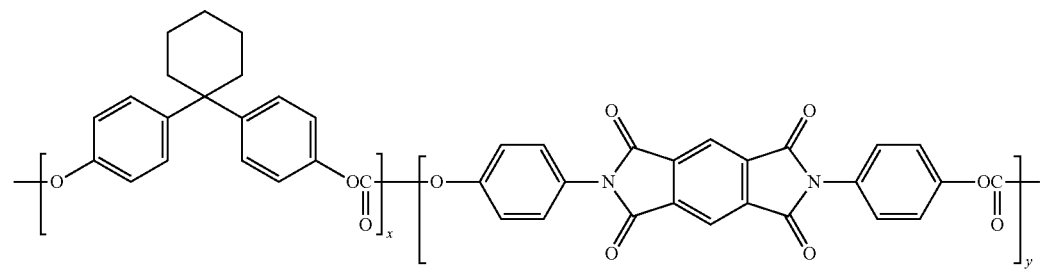

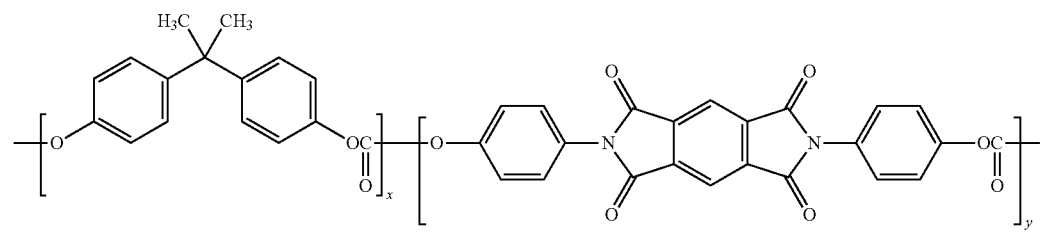

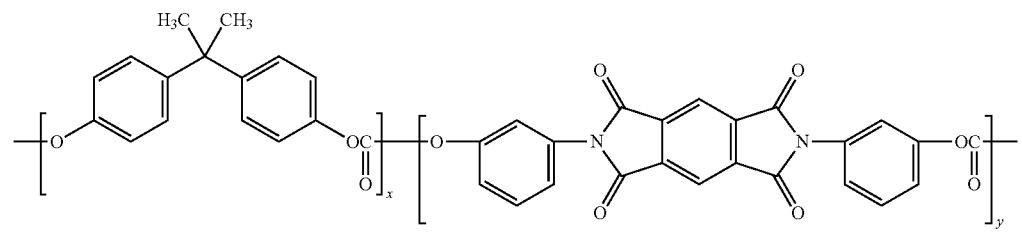

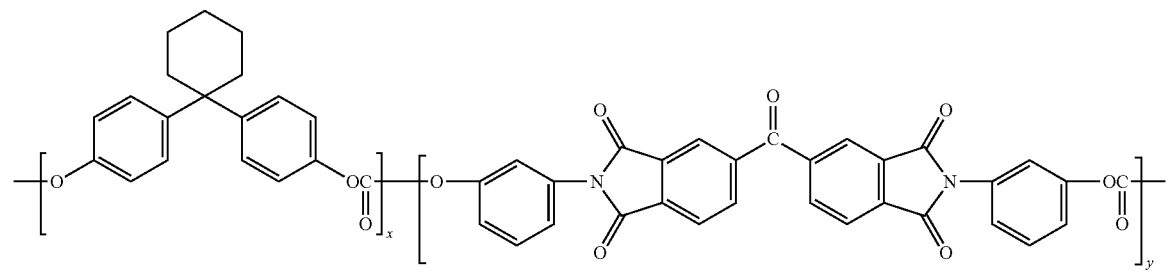

-continued

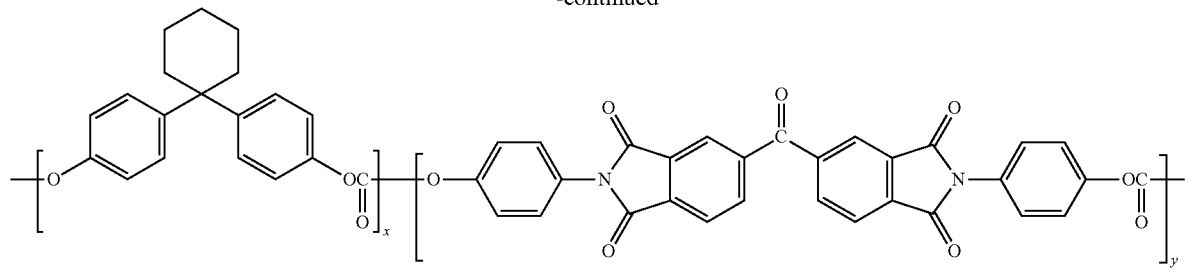

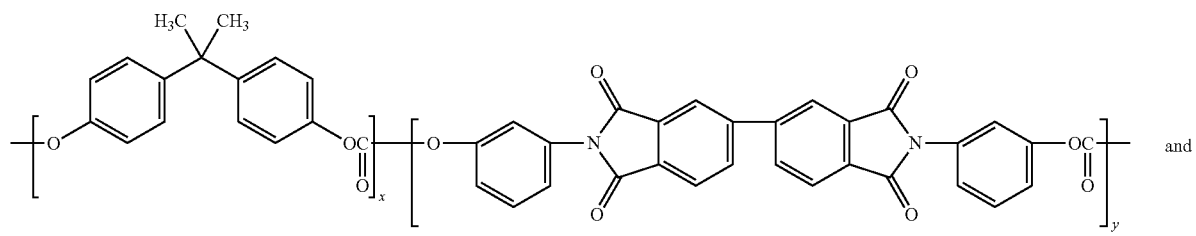

and

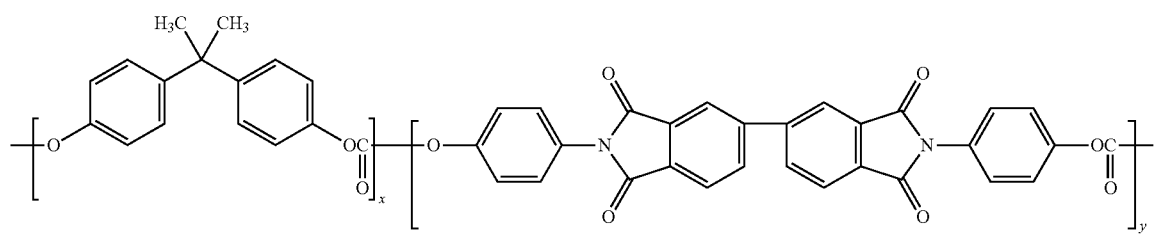

wherein x and y each represents the mole percent of the repeating segment, and x is from about 75 to about 95, y is from about 5 to about 25, a sum of x+y is equal to about 100, and optionally each with a weight average molecular weight (Mw) of from about 30,000 to about 500,000, and a number average molecular weight (Mn) of from about 5,000 to about 100,000.

10. The intermediate transfer member of claim 8, wherein the surface layer has a thickness of from about 1 micron to about 150 microns.

11. The intermediate transfer member of claim 8 wherein the conductive particles are selected from the group consisting of carbon black, graphite, acetylene black, fluorinated carbon black, metal oxides, doped metal oxides polyaniline, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixtures thereof.

12. The intermediate transfer member of claim 8, wherein the surface layer has a surface resistivity of from about $10^8$ $\Omega$/square to about $10^{13}$ $\Omega$/square.

13. The intermediate transfer member of claim 8, wherein the substrate layer comprises a material selected from the group consisting of polyesters, polyurethanes, polyimides, polyamideimides, fluorinated polyimides, polyolefins, polyamides, polyetherimides, phenoxy resins, polyphenylene sulfides, polysulfones, polyethersulfones, polyphenylsulfones, polycarbonates, PVDF and acrylics.

14. An intermediate transfer member comprising:
a surface layer comprising a poly(imide-carbonate) copolymer comprising the structure:

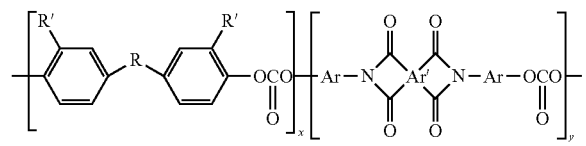

wherein R' is hydrogen or methyl; R is methylene, isopropylidene, cyclohexylidene, sulfonyl, ethylidene, or hexafluoroisopropylidene; Ar is p-phenylene or m-phenylene; and Ar' is benzene, diphenylbenzene, biphenyl, naphthalene, benzophenone, or perylene; x and y each represents the mole percent of the repeating units, x is from about 70 to about 98, y is from about 2 to 30 and the sum of x+y is equal to about 100.

15. The intermediate transfer member of claim 14 wherein the poly(imide-carbonate) copolymer is selected from the group consisting of:

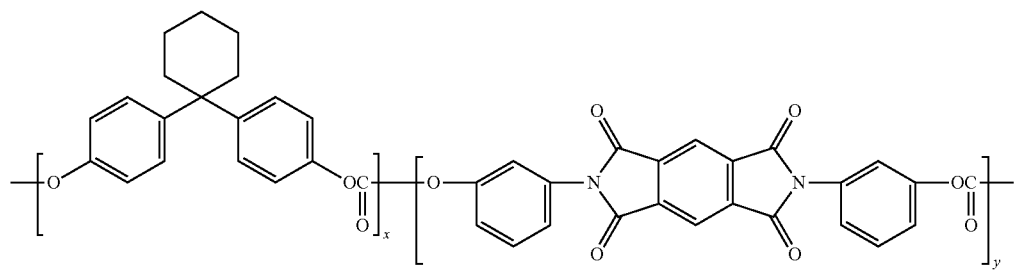
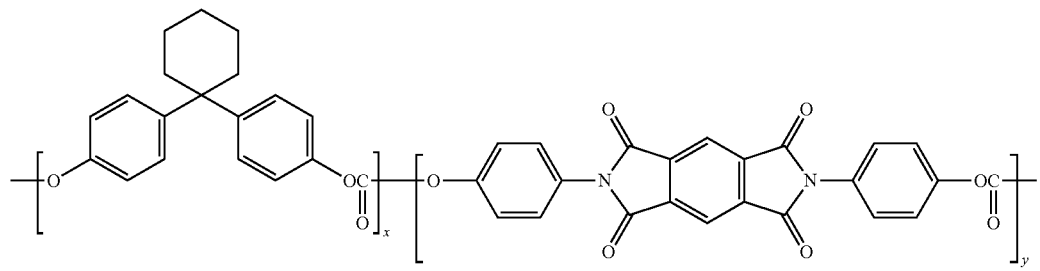
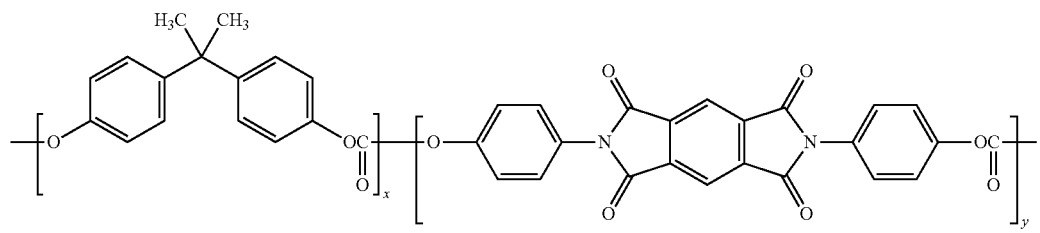
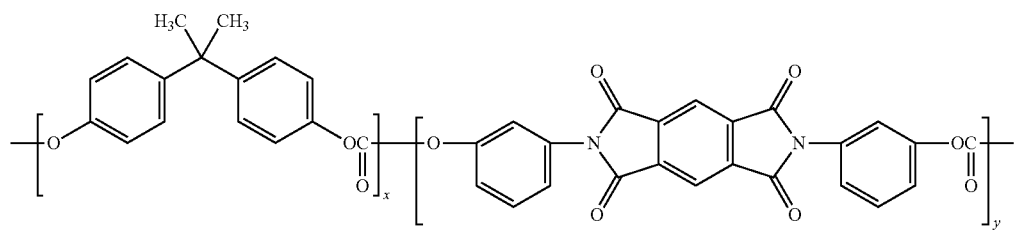
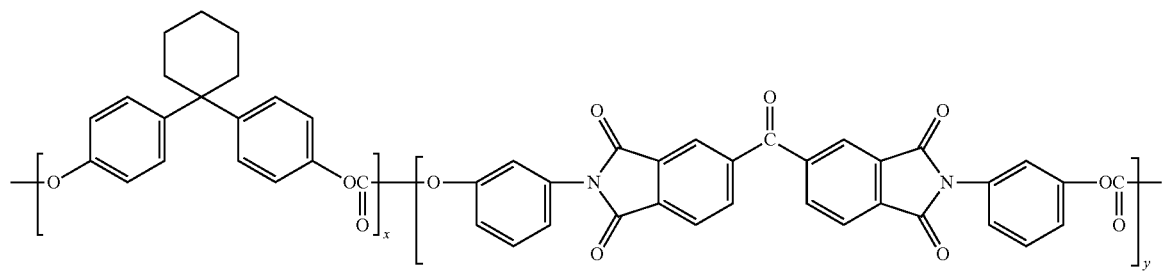
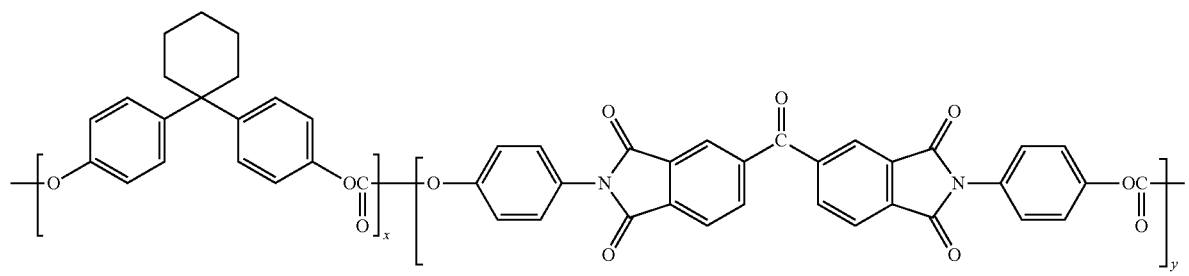

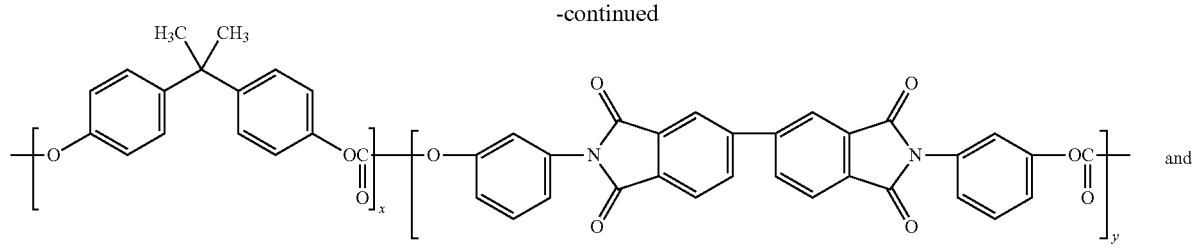

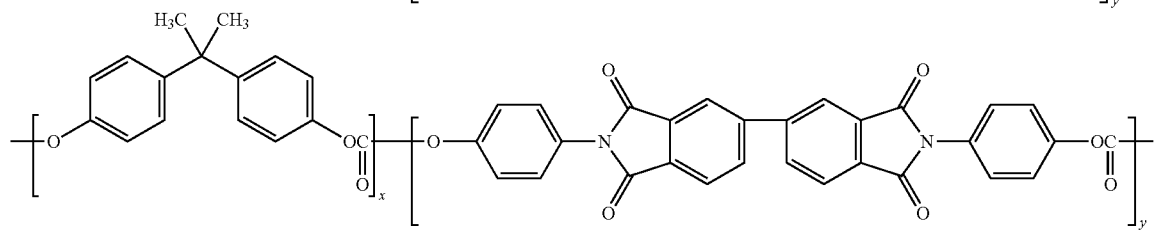

wherein x and y each represents the mole percent of the repeating segment, and x is from about 75 to about 95, y is from about 5 to about 25, a sum of x+y is equal to about 100, and optionally each with a weight average molecular weight (Mw) of from about 30,000 to about 500,000, and a number average molecular weight (Mn) of from about 5,000 to about 100,000.

16. The intermediate transfer member of claim 14 wherein the poly(imide-carbonate) copolymer is

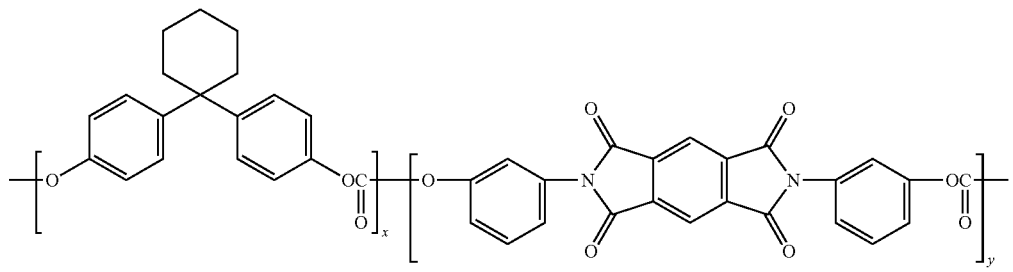

wherein x and y each represents the mole percent of the repeating segment, and x is from about 75 to about 95, and y is from about 5 to about 25.

17. The intermediate transfer member of claim 14, wherein the surface layer has a surface resistivity of from about $10^8$ Ω/square to about $10^{13}$ Ω/square.

* * * * *